(12) United States Patent
Takeishi

(10) Patent No.: US 10,438,103 B2
(45) Date of Patent: Oct. 8, 2019

(54) INFORMATION PROCESSING APPARATUS, RECORDING MEDIUM, AND INFORMATION EXCHANGE METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Toshiki Takeishi, Mishima Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/713,915

(22) Filed: Sep. 25, 2017

(65) Prior Publication Data
US 2019/0095772 A1    Mar. 28, 2019

(51) Int. Cl.
*G06K 19/07*  (2006.01)
*H04L 29/06*  (2006.01)
*G06Q 20/34*  (2012.01)
*H04W 12/06*  (2009.01)
*H04W 88/02*  (2009.01)
*G06K 17/00*  (2006.01)
*G06Q 20/32*  (2012.01)
(Continued)

(52) U.S. Cl.
CPC ..... *G06K 19/0723* (2013.01); *G06K 7/10237* (2013.01); *G06K 17/0022* (2013.01); *G06Q 20/327* (2013.01); *G06Q 20/352* (2013.01); *G06Q 20/405* (2013.01); *H04L 63/0853* (2013.01); *H04W 12/06* (2013.01); *H04W 88/023* (2013.01)

(58) Field of Classification Search
USPC .......................................................... 235/380
See application file for complete search history.

(56) References Cited

U.S. PATENT DOCUMENTS

2012/0034868 A1   2/2012   Fine et al.
2012/0072577 A1   3/2012   Motoyama
(Continued)

OTHER PUBLICATIONS

Non-Final Office Action for U.S. Appl. No. 15/924,609 dated Jun. 7, 2019.

*Primary Examiner* — Rafferty D Kelly
(74) *Attorney, Agent, or Firm* — Amin, Turocy & Watson LLP

(57) ABSTRACT

According to an embodiment, an information processing apparatus includes a non-contact communication device and a processor. The non-contact communication device performs non-contact communication in a reader mode or an inter-device communication mode. The processor switches the non-contact communication device to the inter-device communication mode when transmission request information for requesting transfer of specific information is set in an electronic message received by the non-contact communication device in the reader mode from a second non-contact communication device, and cause the non-contact communication device that is switched to the inter-device communication mode to transmit the electronic message including the information requested in the transmission request information to the second non-contact communication device.

13 Claims, 7 Drawing Sheets

(51) Int. Cl.
    *G06Q 20/40*     (2012.01)
    *G06K 7/10*     (2006.01)

(56) References Cited

U.S. PATENT DOCUMENTS

2012/0196529 A1\*    8/2012    Huomo ................ G06Q 20/045
                                                                455/41.1
2015/0382135 A1    12/2015    Kawahara et al.

\* cited by examiner

INFORMATION PROCESSING APPARATUS, RECORDING MEDIUM, AND INFORMATION EXCHANGE METHOD

FIELD

Embodiments described herein relate generally to an information processing apparatus, a recording medium, and an information exchange method.

BACKGROUND

Some information processing apparatuses, such as a digital multi-function peripheral, a settlement apparatus (POS terminal) or an information distribution apparatus, are equipped with devices that perform non-contact communication. The non-contact communication is one in which two non-contact communication devices wirelessly communicate in close proximity (an area of about several centimeters). As non-contact communication, for example, a communication method called near field communication (NFC) is known. Non-contact communication is often operated as a technology for reading information from a non-contact IC card or a portable electronic device (mobile terminal). For example, an NFC terminal provided in an information processing apparatus such as a digital multi-function peripheral is used to read information such as authentication information from a non-contact IC card or a mobile terminal.

However, the NFC terminal mounted in an information processing apparatus in the related art usually functions as a card reader for reading information from a portable terminal. The card reader does not function as an interface for supplying a large amount of data to the mobile terminal at high speed. Therefore, there is a problem that communication control for acquiring data from the information processing apparatus becomes complicated even for a mobile terminal that may communicate with the information processing apparatus with NFC.

DETAILED DESCRIPTION

In order to solve the above-mentioned problem, an exemplary embodiment aims to provide an information processing apparatus, a recording medium, and an information exchange method capable of performing highly convenient information communication.

According to an embodiment, the information processing apparatus includes a non-contact communication device and a processor. The non-contact communication device performs non-contact communication in a reader mode or an inter-device communication mode. The processor switches the non-contact communication device to the inter-device communication mode when transmission request information for requesting transfer of specific information is set in an electronic message received by the non-contact communication device in the reader mode from a second non-contact communication device, in which the non-contact communication device that is switched to the inter-device communication mode transmits the electronic message including the information requested in the transmission request information to the second non-contact communication device.

Hereinafter, an embodiment will be described with reference to the drawings.

First, a communication system according to the embodiment will be described.

Figure 1:
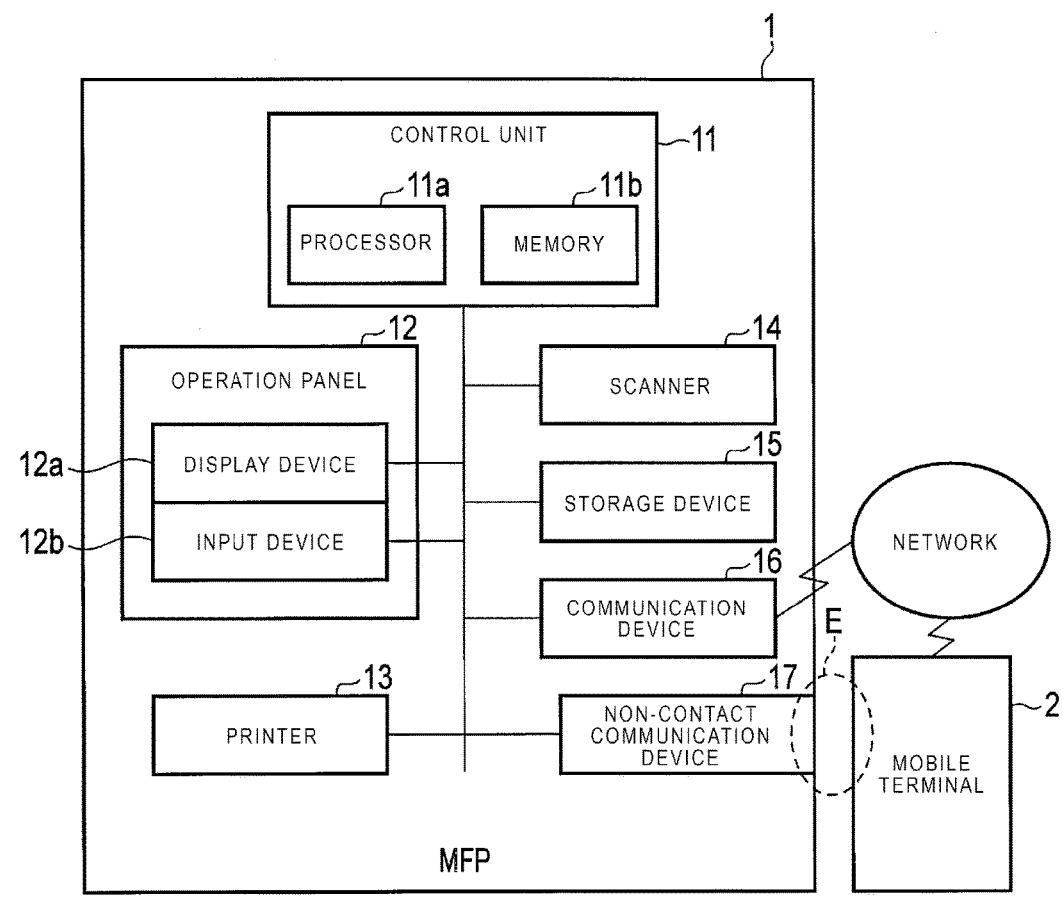
FIG. 1 is a block diagram showing a configuration example of a digital multi-function peripheral as an information processing apparatus according to an embodiment.

FIG. 1 is a block diagram showing a configuration example of the communication system including a digital multi-function peripheral (MFP) 1 as an information processing apparatus and the MFP 1 according to the embodiment.

The MFP 1 is an example of an information processing apparatus for exchanging information with a mobile terminal 2. The information processing apparatus is not limited to the MFP 1 but may be any apparatus that exchanges information with the mobile terminal 2. For example, the information processing apparatus may be a settlement apparatus (POS terminal) that performs settlement processing of products or an information distribution apparatus (kiosk terminal) that distributes information.

However, in the present embodiment, it is assumed that the information processing apparatus is the MFP 1. The MFP 1 is an image processing apparatus (a printing apparatus, an image reading apparatus, a copying apparatus, and the like) that performs image processing such as printing, scanning, and copying. The mobile terminal 2 is a portable electronic device (for example, a mobile phone, a smart phone, a tablet PC, and the like) possessed by a user.

In the present embodiment, the MFP 1 and the mobile terminal 2 have a function (first communication function) for performing non-contact communication for communicating in close proximity. The non-contact communication (near distance communication) may be any communication in close proximity (a narrow communication area of about several centimeters). Here, it is assumed that non-contact communication is a communication through a communication method that is applicable to a mobile terminal having a communication function equivalent to that of a non-contact type IC card or a non-contact type IC card. For example, as a communication method of non-contact communication, there is what is called near field communication (NFC). The non-contact communication may be communication by communication standards other than NFC, but in the present embodiment, it is assumed that non-contact communication is NFC.

In the present embodiment, it is assumed that a device (non-contact communication device) that performs non-contact communication operates in any one of the operation modes of a card emulation mode, a card reader mode, or a peer-to-peer (P2P) (inter-device communication) mode. The card emulation mode (hereinafter, referred to as a card mode) is an operation mode for performing the same operation as the non-contact IC card. Further, the card reader mode (hereinafter, referred to as a reader mode) is an operation mode for performing the same operation as the card reader for the non-contact type IC card. The reader mode is an operation mode in which information is read from a non-contact communication device (non-contact type IC card or card mode non-contact communication device) within the communication range of non-contact communication. The P2P mode is an operation mode in which data is exchanged between two non-contact communication devices.

Further, the MFP 1 and the mobile terminal 2 also have a data communication function (second communication function) that transmits and receives data bi-directionally by a communication method different from non-contact communication. The data communication function between the MFP 1 and the mobile terminal 2 may be any communication as long as transmission and reception of data such as print data may be performed. In the present embodiment, it is assumed that the data communication function has a function of performing network communication for transmitting and receiving data via a network. Further, it is assumed that the network communication between the MFP 1 and the mobile terminal 2 is communication by a wireless LAN. However, the data communication function may be communication in a network including a wide area network (WAN) or may be another short-distance wireless communication different from non-contact communication.

Next, a configuration example of the MFP 1 as an information processing apparatus will be described.

As shown in FIG. 1, the MFP 1 includes a control unit 11, an operation panel 12, a printer 13, a scanner 14, a storage device 15, a communication device 16, and a non-contact communication device (NFC terminal) 17.

The control unit 11 includes a processor 11a and a memory 11b. The processor 11a is, for example, a central processing unit (CPU). The processor 11a is connected to each unit in the MFP 1 via a bus. The processor 11a executes an operation as the control unit 11 by executing a program stored in the memory 11b or the storage device 15. For example, the processor 11a executes the basic operation control of the MFP 1 by executing a program of an operating system (OS). In addition, the processor 11a executes various processing by executing an application program designed according to processing contents.

In addition, the memory 11b is constituted by a memory device such as a RAM and a ROM. For example, the ROM in the memory 11b stores various programs such as an OS program or an application program executed by the processor 11a. In addition, the RAM in the memory 11b is used, for example, as a work area for storing data to be temporarily used.

The storage device 15 is a rewritable nonvolatile memory. The storage device 15 consists of memory devices such as a hard disk drive (HDD), a solid state drive (SSD) or an electric erasable programmable read-only memory (EEPROM (registered trademark)), for example. The storage device 15 may store an OS or an application program. In addition, the storage device 15 stores data generated by processing executed by the processor 11a. In addition, the storage device 15 stores data to be used in various processing executed by the processor 11a.

The operation panel 12 includes a display device 12a and an input device 12b. The display device 12a displays information. The display device 12a is, for example, a display that consists of a liquid crystal display or an organic electroluminescence (EL) display or the like. The input device 12b accepts an operation by a user (operator). The input device 12b is configured to include, for example, a touch panel, a keyboard, a numeric keypad, and the like. For example, the display device 12a and the input device 12b may consist of a display panel having a touch panel.

The printer 13 prints an image on a recording medium such as paper. The configuration of the printer 13 is not limited to a specific image forming method. For example, the printer 13 may be an electrophotographic method, an ink-jet method, or a thermal transfer method. In the present embodiment, it is assumed that the printer 13 is an electrophotographic type printer.

The scanner 14 reads the image of a document as image data. For example, the scanner 14 optically scans an image of a document to acquire image data. In this case, the scanner 14 includes an imaging element such as a charge-coupled device (CCD) image sensor and an optical system for guiding light from an original document to the imaging element. The scanner 14 may read images by other methods.

The communication device 16 is an interface for data communication. In the present embodiment, it is assumed that the communication device 16 is an interface for wirelessly communicating with the mobile terminal 2 via a network as a wireless LAN.

The non-contact communication device 17 is an interface for communication that performs non-contact communication. The non-contact communication device 17 is constituted by an antenna, a communication control circuit, and the like. The non-contact communication device 17 performs non-contact communication with another non-contact communication device in a connected state by electromagnetic coupling via the antenna. In the present embodiment, it is assumed that the non-contact communication device 17 performs non-contact communication with a non-contact communication device 27 of the mobile terminal 2 in a communication range E by NFC.

The non-contact communication device 17 operates in any one of the operation modes of the card mode, the reader mode or the P2P mode. The operation mode of the non-contact communication device 17 is switched under the control of the control unit 11. The non-contact communication device 17 is reactivated under the control of the control unit 11, whereby the operation mode is switched. For example, the non-contact communication device 17 in the reader mode is switched to the P2P mode by being reactivated under the control of the control unit 11.

Next, the configuration of the mobile terminal 2 will be described.

Figure 2:
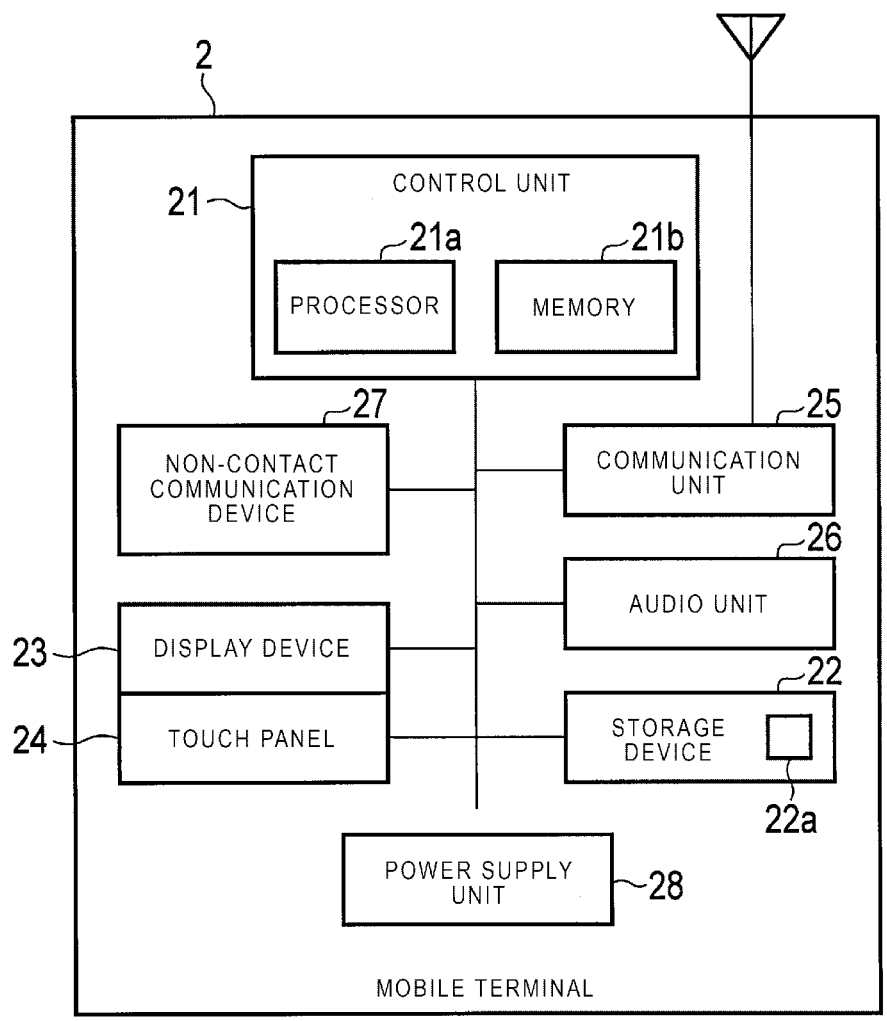
FIG. 2 is a block diagram showing a configuration example of a mobile terminal according to the embodiment.

FIG. 2 is a block diagram showing a configuration example of the mobile terminal 2 according to the embodiment.

The mobile terminal 2 in the configuration example shown in FIG. 2 is a portable electronic device such as a smartphone, a tablet PC, a mobile phone, a PDA, or the like. As shown in FIG. 2, the mobile terminal 2 includes a control unit 21, a storage device 22, a display device 23, an input device 24, a communication unit 25, an audio unit 26, the non-contact communication device 27, a power supply unit 28, and the like.

The control unit 21 includes a processor 21a and a memory 21b. The processor 21a is, for example, a CPU. The processor 21a realizes various processing functions by executing a program. The memory 21b is constituted by a memory device such as a RAM and a ROM. For example, the ROM in the memory 21b stores various programs such as an OS program or an application program. In addition, the RAM in the memory 21b is used, for example, as a work area for storing data to be temporarily used.

The storage device 22 is a rewritable nonvolatile memory in which various data are stored. Various application programs (applications), control data, user data, and the like are stored in the nonvolatile memory 22. For example, the nonvolatile memory 22 stores an application to be downloaded via a network or the like by the user's operation. The processor 21a of the control unit 21 realizes various functions by executing the application programs stored in the storage device 22.

The display device 23 is constituted by a display device. In the display device 23, on and off of display and the contents of the display are controlled by the control unit 21. The input device 24 is constituted by a touch panel, a ten key, a keyboard, and the like. The input device 24 supplies an operation instruction input by the user to the control unit 21. For example, the display device 23 and the input device 24 are constituted by a display device with a touch panel.

The communication unit 25 is connected to the antenna and wirelessly communicates via the antenna. The communication unit 25 provides a communication function for the mobile terminal 2 to communicate with the MFP 1 via the network. For example, the communication unit 25 transmits print data to the MFP 1.

The audio unit 26 inputs and outputs audio. The audio unit 26 includes an analog front-end unit, an audio unit, and the like. A speaker, a receiver, a microphone, and the like are connected to the audio unit 26.

The power supply unit 28 is constituted by, for example, a rechargeable battery or the like. The power supply unit 28 supplies power to each unit in the mobile terminal 2.

The non-contact communication device 27 performs non-contact communication (short-distance wireless communication) with another non-contact communication device. The non-contact communication device 27 is constituted by an antenna for short-distance wireless communication and an IC chip (including a communication control circuit) for communication control and the like. The non-contact communication device 27 performs non-contact communication with another non-contact communication device in a connected state by electromagnetic coupling via the antenna. For example, the non-contact communication device 27 performs non-contact communication by NFC with the non-contact communication device 17 of the MFP 1.

The non-contact communication device 27 operates in any one of the operation modes of the card mode or the reader mode. The non-contact communication device 27 operates in an operation mode set by the control unit 11. In the present embodiment, the non-contact communication device 27 operates to perform non-contact communication with the non-contact communication device 17 of the MFP 1. Therefore, the operation mode of the non-contact communication device 27 is switched according to the operation mode of the non-contact communication device 17 of the MFP 1. For example, when switching the non-contact communication device 17 from the reader mode to the card mode, the non-contact communication device 27 is switched from the card mode to the reader mode.

It is assumed that the non-contact communication device 27 is activated when presented in the communication range E and is stopped when separated from the communication range E. In the present embodiment, it is assumed that the non-contact communication device 27 needs to be reactivated in order to switch the operation mode. When the non-contact communication device 27 having such a specification is once separated from the communication range E and is presented to the communication range E again, it is possible to switch the operation mode by reactivation. For example, it is assumed that the non-contact communication device 27 in the card mode is switched to the reader mode by being presented again in the communication range E after once being separated from the communication range E.

In addition, the storage device 22 stores an application program (cooperative application for MFP) 22a for the mobile terminal 2 to operate in cooperation with the MFP 1. The processor 21a of the control unit 21 realizes the information exchange processing with the MFP 1, which will be described later, by executing the cooperative application for an MFP (hereinafter, simply referred to as a cooperative application) 22a. For example, the processor 21a loads the cooperative application 22a on the work memory (RAM) of the memory 21b. The processor 21a executes the information exchange processing using NFC with the MFP 1 by executing the cooperative application 22a loaded in the memory 21b.

Next, information exchange processing (communication control) between the MFP 1 and the mobile terminal 2 in the communication system will be briefly described.

Figure 3:
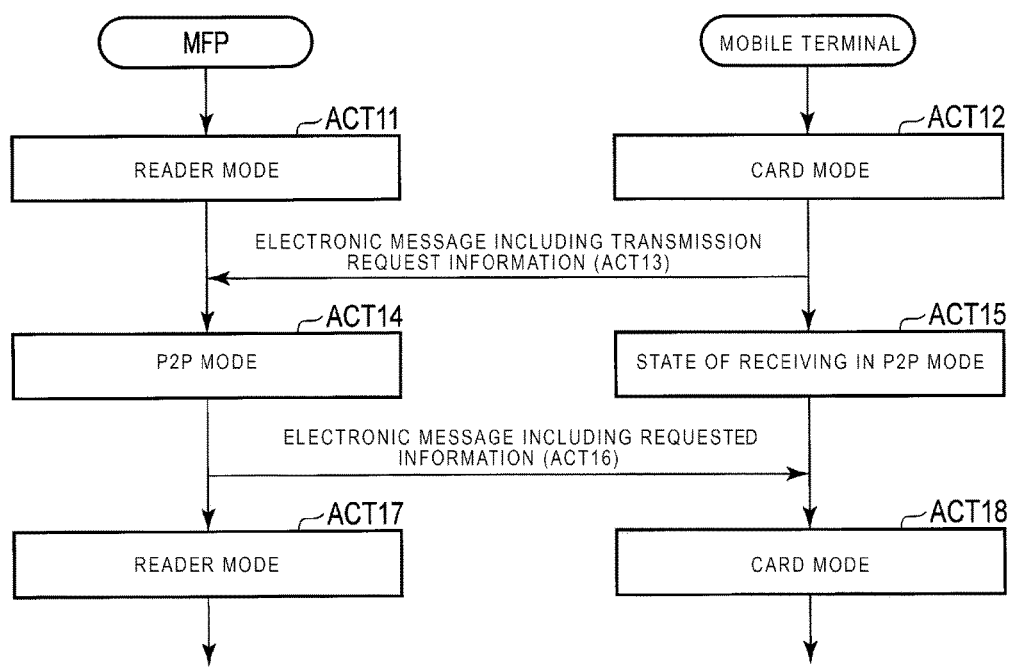
FIG. 3 is a sequence diagram for explaining a flow of information exchange processing between the digital multi-function peripheral and the mobile terminal.

FIG. 3 is a sequence diagram schematically showing the flow of information exchange processing between the MFP 1 and the mobile terminal 2 in the communication system.

In a standby state, it is assumed that the non-contact communication device 17 of the MFP 1 waits in the reader mode (ACT 11). On the other hand, when the cooperative application 22a is activated, the mobile terminal 2 activates the non-contact communication device 27 in the card mode (ACT 12). In this state, the non-contact communication device 17 of the MFP 1 in the reader mode receives an electronic message from the non-contact communication device 17 of the mobile terminal 2 in the card mode in the communication range E.

The cooperative application 22a installed in the mobile terminal 2 realizes information exchange processing with the MFP 1 by non-contact communication and various processing request functions for the MFP 1. For example, in the information exchange processing, the mobile terminal 2 realizes a function of acquiring the information supplied from the MFP 1 in the P2P mode by the function provided by the cooperative application 22a. The mobile terminal 2 requests information from the MFP 1 by setting the transmission request information as specific information in tag information of information to be transmitted in the card mode (an electronic message to be transmitted to the MFP 1 in the reader mode).

The transmission request information is information indicating that transfer of specific information is requested to the MFP 1. The transmission request information is information indicating that information is requested to the MFP 1 (a device in the reader mode). The transmission request information may be specific information set in a record of an electronic message or may be specific information (a character string) set in a card ID as identification information indicating a transmission source of the electronic message. Here, it is assumed that the transmission request information is specific information set in the tag information in the electronic message.

In addition, the information requested in the transmission request information is not limited to specific information but may be appropriately set according to the operation mode or the like. For example, the information requested in the transmission request information is connection information (for example, an IP address of the MFP 1) for transmitting a print job (print data) to the MFP 1 by data notification other than non-contact communication. In addition, the information requested in the transmission request information may be information for requesting status information indicating the state of the MFP 1 (for example, information on the availability of print processing, the remaining amount of toner or ink, information on a sheet set, and the like). In addition, the transmission request information may be information for requesting the MFP 1 for the information to be used for authentication processing (challenge information) as authentication request information.

When the non-contact communication device 27 enters the communication range E, the mobile terminal 2 in the card mode transmits the electronic message to the MFP 1 in the reader mode. When requesting information from the MFP 1, the mobile terminal 2 transmits the electronic message in which the transmission request information for requesting information is set in the tag information to the MFP 1 (ACT 13). On the other hand, the MFP 1 in the reader mode receives the electronic message transmitted from the mobile terminal 2 in the card mode.

When the transmission request information for requesting information is set in the received electronic message, the MFP 1 in the reader mode switches the operation mode from the reader mode to the P2P mode (ACT 14). For example, the MFP 1 switches the operation mode from the reader mode to the P2P mode by reactivating the non-contact communication device 17.

In addition, after transmitting the electronic message in which the transmission request information for requesting the transmission of the specific information is set in the tag information, the mobile terminal 2 sets the state where the electronic message to be transmitted by the MFP 1 in the P2P mode may be received (ACT 15). For example, if the specification is such that information transferred in the P2P mode may be received even in the card mode, the mobile terminal 2 waits without changing the operation mode. For example, a specification in which data in the P2P mode may be received in the card mode is provided by the OS executed by the processor 21*a*. In addition, if the specification is such that the electronic message transferred in the P2P mode may not be received in the card mode, the mobile terminal 2 switches the operation mode from the card mode to the P2P mode.

The MFP 1 that switched to the P2P mode transmits the electronic message including the information requested in the transmission request information to the mobile terminal 2 in the P2P mode (ACT 16). For example, when the connection information for connecting to the MFP 1 is requested, the MFP 1 supplies the electronic message including the connection information to the mobile terminal 2 after switching to the P2P mode. In addition, when the state information is requested, the MFP 1 supplies the electronic message including the state information indicating the state of the MFP 1 to the mobile terminal 2 after switching to the P2P mode.

In a state where the electronic message transferred in the P2P mode may be received, the mobile terminal 2 receives the electronic message transferred by the MFP 1 in the P2P mode. Upon receiving the electronic message transferred by the MFP 1 in the P2P mode, the mobile terminal 2 acquires the information requested in the transmission request information included in the received electronic message. Upon acquiring the information requested from the electronic message received in the P2P mode, the mobile terminal 2 operates in the card mode (ACT 18).

In addition, upon acquiring the information requested from the electronic message received in the P2P mode, the mobile terminal 2 may execute processing based on the acquired information. For example, when acquiring the connection information (for example, connection information on the network) of the MFP 1, the mobile terminal 2 communicatively connects to the MFP 1 via the network based on the acquired connection information. The mobile terminal 2 communicatively connected to the MFP 1 via the network may request the MFP 1 to perform processing involving data communication of data with a large data amount. For example, the mobile terminal 2 may request the MFP 1 to perform print processing by transmitting print data (a print job) via the network.

As described above, in the standby state, the MFP 1 operating in the reader mode switches to the P2P mode according to the request from the mobile terminal 2 and supplies the information to the mobile terminal. With such communication control, the MPF and the mobile terminal may mutually exchange information by NFC communication. In addition, the information exchange processing described above may be realized by presenting the mobile terminal in the communication range E, and information exchange may be performed with a simple operation.

Next, the operation of the MFP 1 in the information exchange processing described above will be described.

Figure 4:
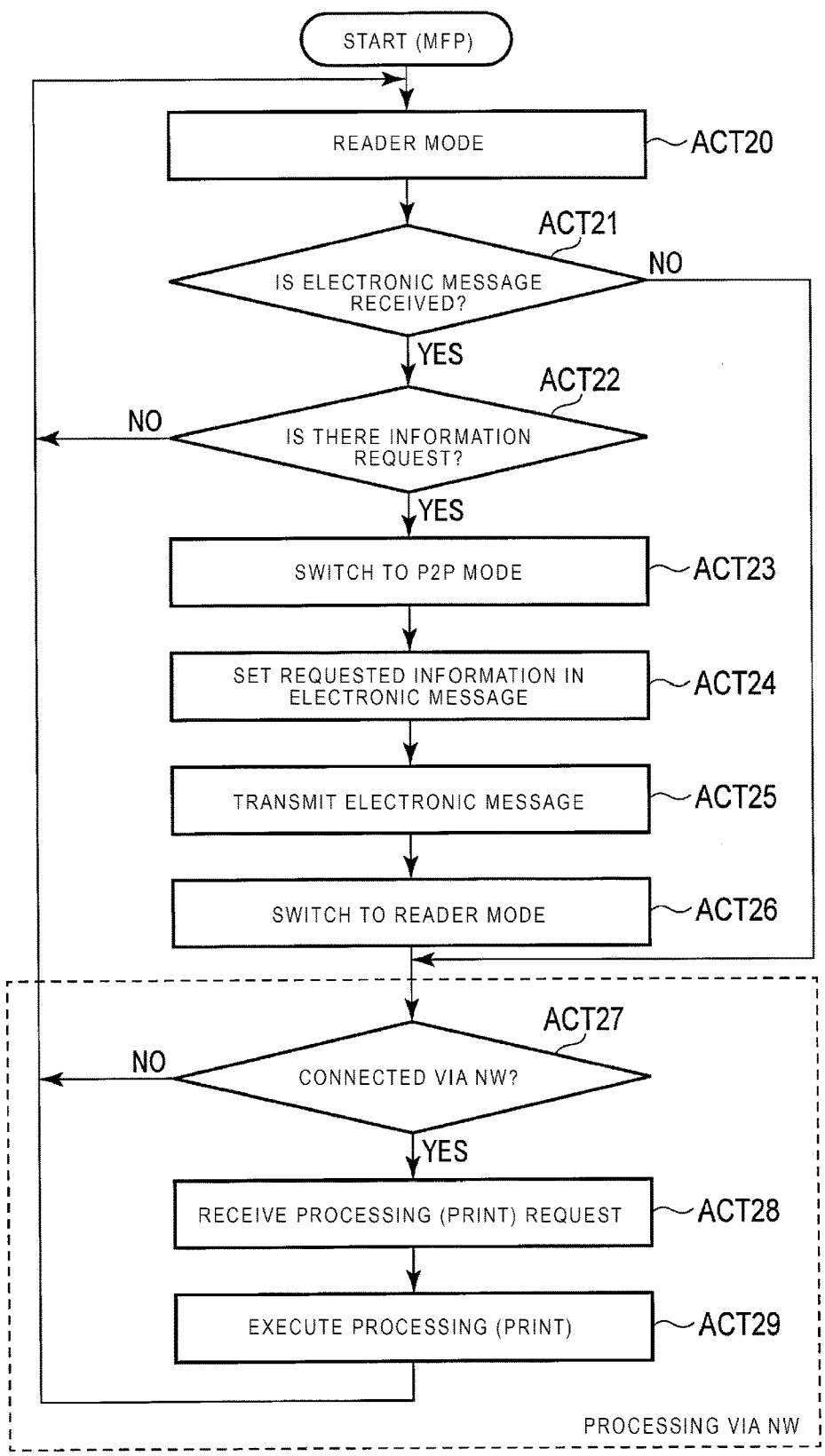
FIG. 4 is a flowchart for explaining an operation example of information exchange processing in the digital multi-function peripheral.

FIG. 4 is a flowchart for explaining an operation example of the MFP 1.

In a standby state, the non-contact communication device 17 of the MFP 1 waits in the reader mode (ACT 20). In the reader mode, the non-contact communication device 17 of the MFP 1 transmits radio waves in the communication range E and receives an electronic message as a response from the non-contact communication device within the communication range E. When the non-contact communication device 27 of the mobile terminal 2 in the card mode enters the communication range E, the non-contact communication device 17 performs processing of reading information from the mobile terminal 2 (ACT 21). As the processing of reading information from the mobile terminal 2, the non-contact communication device 17 receives an electronic message (response electronic message) of a predetermined format from the mobile terminal 2.

The format of the electronic message received by the non-contact communication device 17 in the reader mode may be any format that conforms to the communication standard of NFC. Here, the electronic message includes tag information that may set the transmission request information for requesting information. The transmission request information may be information for requesting the MFP 1 for information that the MFP 1 holds or generates. For example, the transmission request information may be information for requesting connection information for connecting to the MFP 1 via the network. In addition, the transmission request information may be information for requesting the status information of the MFP 1. In the operation example shown in FIG. 4, it is assumed that the transmission request information is information for requesting connection information for connecting to the MFP 1.

When receiving an electronic message by the non-contact communication device 17 (ACT 21, YES), the control unit 11 of the MFP 1 determines whether or not the transmission request information is set in the tag information of the received electronic message (ACT 22). When the transmission request information is set (ACT 22, YES), the control unit 11 switches the non-contact communication device 17 from the reader mode to the P2P mode (ACT 23). For example, the control unit 11 switches the operation mode to the P2P mode by reactivating the non-contact communication device 17.

In addition, when switching to the P2P mode, the control unit 11 sets the information requested in the transmission request information in the tag information of the electronic message to be transmitted to the mobile terminal 2 in the P2P mode (ACT 24). For example, when connection information is requested in the transmission request information, the control unit 11 sets the IP address or the like of the MFP as the connection information in the tag information of the electronic message. The non-contact communication device 17 that is switched to the P2P mode transmits the electronic message in which the information (connection information) requested in the transmission request information is set to the mobile terminal 2 (ACT 25). In this way, the non-contact communication device 17 of the MFP 1 may transmit the information (connection information) requested in the transmission request information set in the electronic message from the mobile terminal 2 to the mobile terminal 2.

After transmitting the electronic message in which the requested information (connection information) is set, the control unit 11 switches the non-contact communication device 17 from the P2P mode to the reader mode (ACT 26). For example, the control unit 11 switches the operation mode to the reader mode by reactivating the non-contact communication device 17. After switching the non-contact communication device 17 to the reader mode, the control unit 11 enters the standby state.

In addition, in the standby state, the control unit 11 also accepts communication connection via the network based on the connection information transmitted by the electronic message. In the example shown in FIG. 4, a flow of processing for executing printing based on a print job from the mobile terminal connected with the connection information after the MFP 1 transmits the connection information will be described.

When communicatively connecting with the mobile terminal 2 via the network according to the connection information transmitted by the electronic message (ACT 27, YES), the control unit 11 performs data communication with the mobile terminal 2. When communicatively connected to the mobile terminal 2, the control unit 11 accepts a processing request from the mobile terminal 2 (ACT 28). Upon receiving the processing request from the mobile terminal 2, the control unit 11 executes processing according to the request from the mobile terminal 2 (ACT 29). For example, the MFP 1 receives a print request (print job) including print data from the mobile terminal 2. Upon receiving the print job from the mobile terminal 2 communicatively connected according to the connection information, the control unit 11 executes print processing by the printer 13 according to the received indication of the print job.

Next, the operation of the mobile terminal 2 in information exchange processing will be described.

Figure 5:
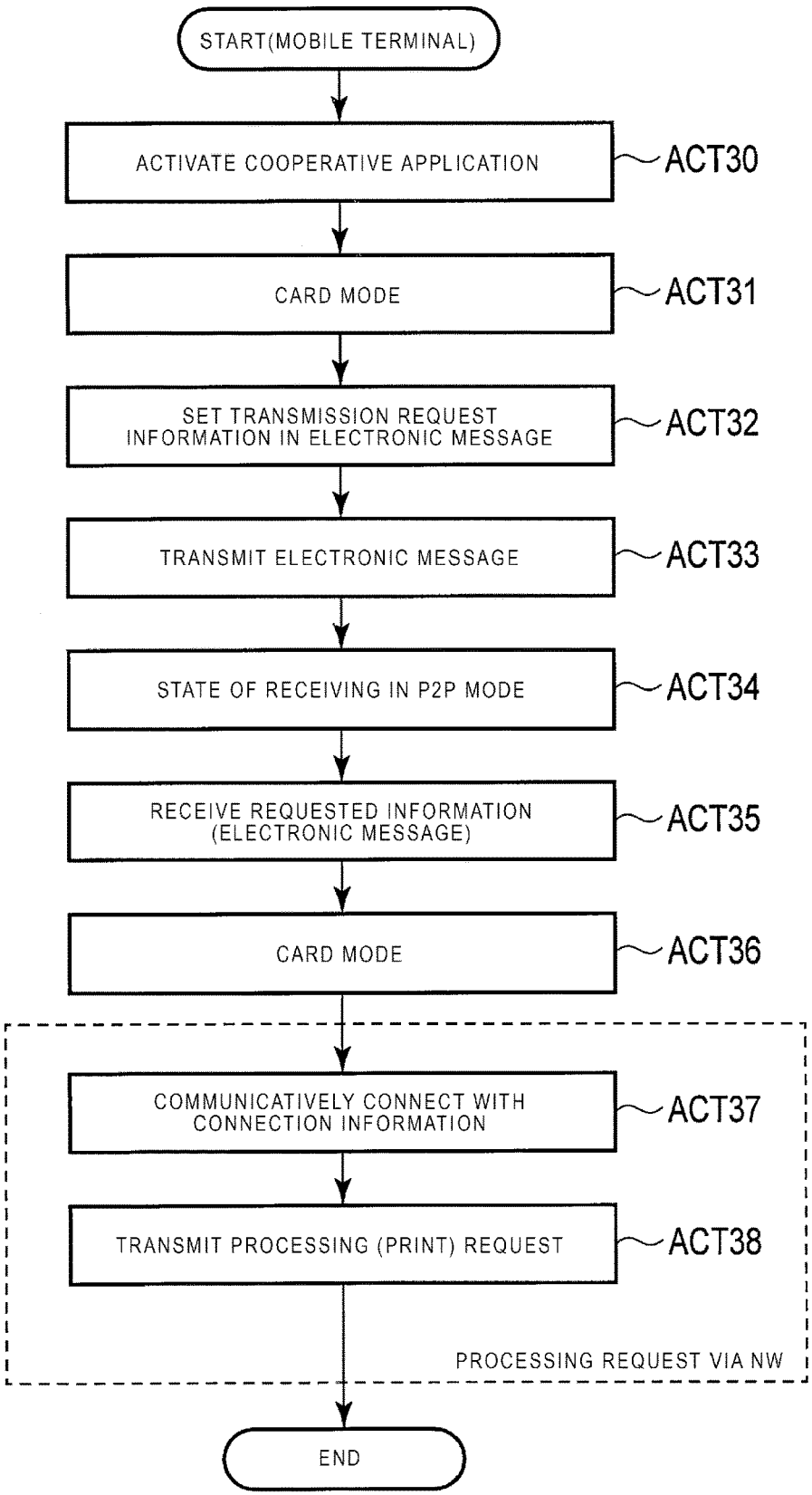
FIG. 5 is a flowchart for explaining an operation example of information exchange processing in the mobile terminal.

FIG. 5 is a flowchart for explaining an operation example of the mobile terminal 2.

The control unit 21 of the mobile terminal 2 activates the cooperative application 22a according to the user's operation (ACT 30). For example, when the user wants to print an image in the mobile terminal 2 with the MFP 1, the user operates the input device 24 of the mobile terminal 2 and instructs activation of the cooperative application 22a. In addition, here, it is assumed that the mobile terminal 2 acquires the connection information to the MFP 1 by NFC and requests the MFP 1 connected via the network to print according to the connection information.

For example, when the user instructs acquisition of the connection information to the MFP 1 by NFC, the control unit 21 activates the cooperative application 22a (ACT 30).

When the cooperative application 22a is activated, the control unit 21 sets the communication mode of non-contact communication by the non-contact communication device 27 to the card mode (ACT 31). When the non-contact communication device 27 is set in the card mode, the control unit 21 creates an electronic message in which the transmission request information for requesting connection information is set (ACT 32). For example, the control unit 21 creates an electronic message of a predetermined format in which the transmission request information for requesting connection information is set in the tag information.

Upon setting the electronic message in which the transmission request information is set, the non-contact communication device 27 transmits the electronic message according to the radio waves from the non-contact communication device 17 of the MFP 1 as a card reader (ACT 33). For example, when the user holds the mobile terminal 2 over the communication range E, the non-contact communication device 27 receives radio waves from the non-contact communication device 17 of the MFP 1 and transmits the electronic message. In this case, the control unit 21 may display a guide on the display device 23 to hold the mobile terminal 2 in the communication range E.

After transmitting the electronic message in which the transmission request information is set by the non-contact communication device 27, the control unit 21 makes it possible to receive the electronic message transferred in the P2P mode (ACT 34). If the specification is such that the electronic message transferred in the P2P mode may be received in the card mode, the control unit 21 keeps the operation mode in the card mode. In addition, if the non-contact communication device 27 also needs to be in the P2P mode, the control unit 21 switches the operation mode from the card mode to the P2P mode. In this case, the control unit 21 may switch to the reader mode according to the transmission of the electronic message including the transmission request information.

The non-contact communication device 27 in a state that may receive information transferred in the P2P mode receives the electronic message in which information (for example, connection information) requested in the transmission request information from the MFP 1 in the P2P mode is set (ACT 35). When the non-contact communication device 27 receives the electronic message transferred in the P2P mode, the control unit 21 extracts the requested information from the received electronic message. For example, the control unit 21 extracts the connection information set in the tag information of the received electronic message. Upon receiving the electronic message including the requested information, the control unit 21 sets the non-contact communication device 27 to the card mode (ACT 36).

In addition, upon acquiring the connection information from the MFP 1, the control unit 21 communicatively connects to the MFP 1 via the network by the communication unit 25 according to the acquired connection information (ACT 37). When communicatively connected to the MFP 1, the control unit 21 transmits a print request (print job) as a processing request to the MFP 1 via the communication unit 25 (ACT 38). For example, when communicatively connecting to the MFP 1, the control unit 21 accepts specification of print data by an input device operated by the user.

The processing that the mobile terminal 2 may request to the MFP 1 communicatively connected via the network is not limited to the print processing. For example, the mobile terminal 2 may request information such as image data read by the scanner 14 to the MFP 1 communicatively connected via the network. In this case, the mobile terminal 2 acquires the image data scanned by the MFP 1 by the scanner 14. In addition, the mobile terminal 2 may acquire information on state information (for example, an executable print mode, a usable paper size, and the like) from the MFP 1 with which communication is connected. Upon acquiring the state information from the MFP 1, the control unit 21 may display information indicating the state of the MFP 1 on the display device 23.

As described above, according to the present embodiment, the non-contact communication device (first NFC terminal) of the MFP in the reader mode reads information from the non-contact communication device (second NFC terminal) of the mobile terminal in the card mode in the communication range. The MFP in the reader mode switches to the P2P mode when the transmission request information is set in the read information. After the operation mode is switched to the P2P mode, the information requested in the P2P mode is transmitted to the mobile terminal. After transmitting the information in the P2P mode, the MFP autonomously switches the non-contact communication device to the reader mode.

Further, it is assumed that the mobile terminal that requested the information to the MFP in the card mode sets a state where the mobile terminal may receive the information transferred in the P2P mode from the MFP. In this way, the mobile terminal may easily acquire information from the MFP by NFC communication. As a result, the MFP and the mobile terminal may mutually transmit and receive information using NFC without using another interface.

For example, the mobile terminal may easily acquire connection information for transmitting print data (a print job) to the MFP by network communication from the MFP using NFC. In addition, the mobile terminal may also easily acquire status information indicating the state of the MFP from the MFP using NFC.

Next, secure authentication processing to which the information exchange processing described above is applied will be described.

Figure 6:
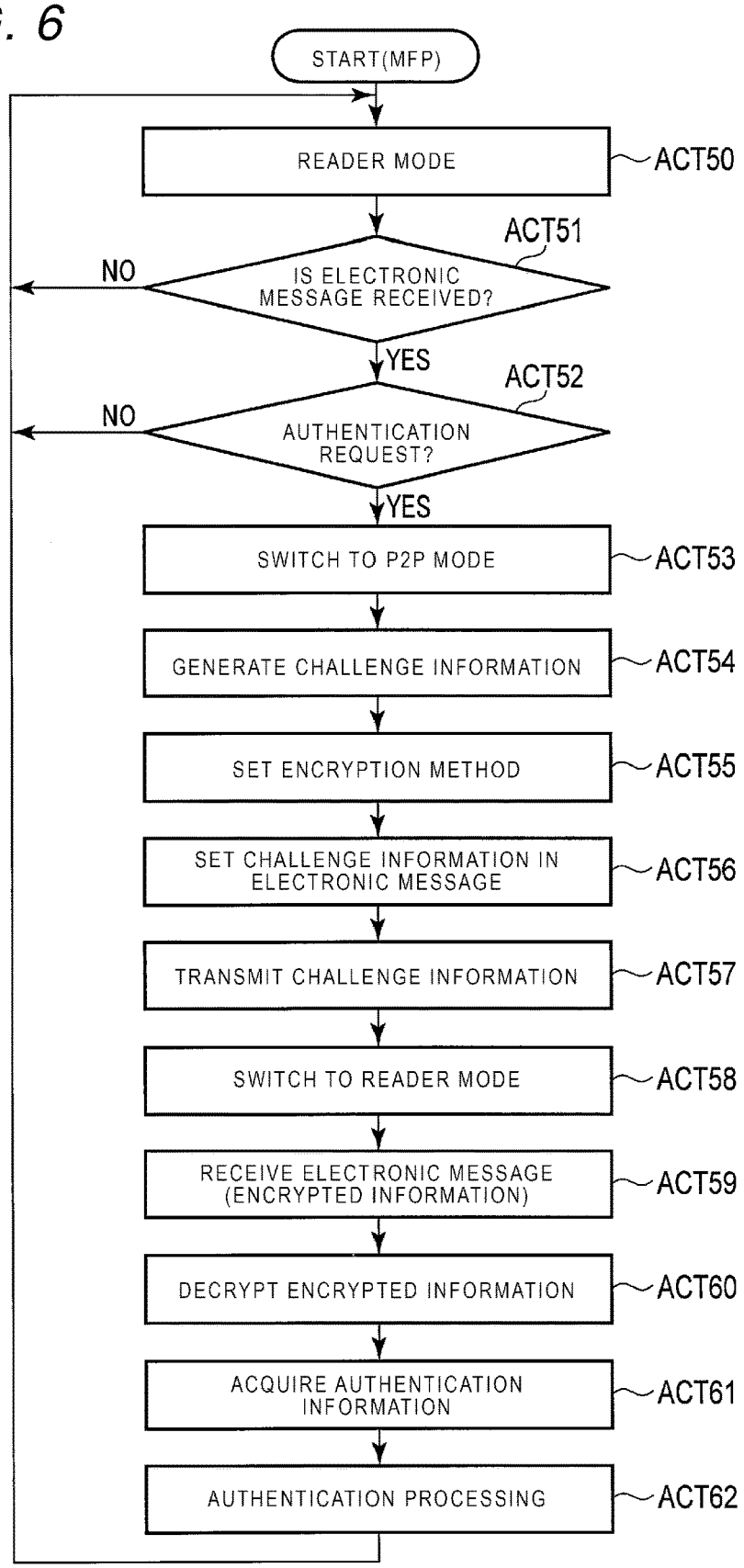
FIG. 6 is a flowchart for explaining an operation example of authentication processing in the digital multi-function peripheral.

FIG. 6 is a flowchart for explaining an operation example of the MFP 1 in the secure authentication processing.

In the standby state, the non-contact communication device 17 of the MFP 1 waits in the reader mode (ACT 50). In the reader mode, the non-contact communication device 17 of the MFP 1 transmits radio waves in the communication range E and receives an electronic message as a response from the non-contact communication device within the communication range E. When the non-contact communication device 27 of the mobile terminal 2 in the card mode enters the communication range E, the non-contact communication device 17 performs processing of reading information from the mobile terminal 2. As the processing of reading information from the mobile terminal 2, the non-contact communication device 17 receives an electronic message (response electronic message) of a predetermined format from the mobile terminal 2.

The format of the electronic message to be transmitted by the mobile terminal 2 in the card mode may be any format as long as the electronic message conforms to the communication standard of NFC and includes tag information in which the transmission request information may be set. In the authentication processing shown in FIG. 6, the mobile terminal 2 transmits the electronic message in which authentication request information as the transmission request information for requesting an authentication request or challenge information to be used for authentication processing is set. Here, the challenge information is information including random information generated by the MFP 1.

When the non-contact communication device 17 receives the electronic message (ACT 51, YES), the control unit 11 of the MFP 1 determines whether or not the authentication request information is set in the tag information of the received electronic message (ACT 52). When the authentication request information is set (ACT 52, YES), the control unit 11 switches the non-contact communication device 17 from the reader mode to the P2P mode (ACT 53). For example, the control unit 11 switches the operation mode to the P2P mode by reactivating the non-contact communication device 17.

In addition, upon receiving the electronic message including authentication request information, the control unit 11 generates an electronic message for setting challenge information to be used for authentication processing to be transmitted to the mobile terminal 2 in the P2P mode. The challenge information includes random information to be used for authentication processing generated by the MFP 1 every time. That is, the control unit 11 generates random information to be used for authentication processing (ACT 54). Here, it is assumed that a randomly selected character string is generated as random information. The random information may be arbitrary information that may be encrypted together with the authentication information and may be a random number or the like.

Upon generating the random information, the control unit 11 determines an encryption method to be used for authentication processing (ACT 55). The encryption method may be any method as long as both the MFP 1 and the mobile terminal 2 may execute the encryption method. The encryption method may be uniquely set beforehand or may be arbitrarily selected from a plurality of methods.

Upon determining the encryption method to be used for authentication processing, the control unit 11 sets the electronic message in which challenge information including random information and information indicating encryption method are set (ACT 56). Upon setting the electronic message in which the challenge information is set, the control unit 11 transmits the electronic message set by the non-contact communication device 17 that is switched to the P2P mode to the mobile terminal 2 (ACT 57). In this way, the non-contact communication device 17 of the MFP 1 may transmit the electronic message including challenge information to the mobile terminal 2 in the P2P mode according to the authentication request from the mobile terminal 2.

After transmitting the electronic message in which the challenge information is set to the mobile terminal 2 in the P2P mode, the control unit 11 switches the non-contact communication device 17 from the P2P mode to the reader mode (ACT 58). For example, the control unit 11 switches the operation mode from the P2P mode to the reader mode by reactivating the non-contact communication device 17.

After switching the non-contact communication device 17 to the reader mode, the control unit 11 receives the electronic message including encrypted information from the mobile terminal 2 (ACT 59). Upon receiving the electronic message including the encrypted information, the control unit 11 extracts the encrypted information from the received electronic message and decrypts the extracted encrypted information (ACT 60). Here, the encrypted information is information obtained by encrypting the information obtained by combining random information and authentication information transmitted as challenge information by a predetermined algorithm with a specified encryption method.

Upon decrypting the encrypted information of the received electronic message, the control unit 11 extracts the authentication information from the information decrypted based on the specified encryption method (ACT 61). The encrypted information included in the electronic message is information obtained by encrypting the information obtained by combining random information and authentication information by the predetermined algorithm. Therefore, by decrypting the encrypted information, the control unit 11 obtains the information obtained by combining random information and authentication information by the predetermined algorithm. In this way, the control unit 11 acquires the authentication information by removing the random information from the decrypted information.

Upon acquiring the authentication information, the control unit 11 performs authentication processing based on the acquired authentication information (ACT 62). For example, the control unit 11 determines whether or not the authentication is successful by comparing the acquired authentication information and previously registered authentication information. That is, when the acquired authentication information matches the previously registered authentication information, the control unit 11 determines that the authentication is successful.

Next, the operation of the mobile terminal 2 in the secure authentication processing will be described.

Figure 7:
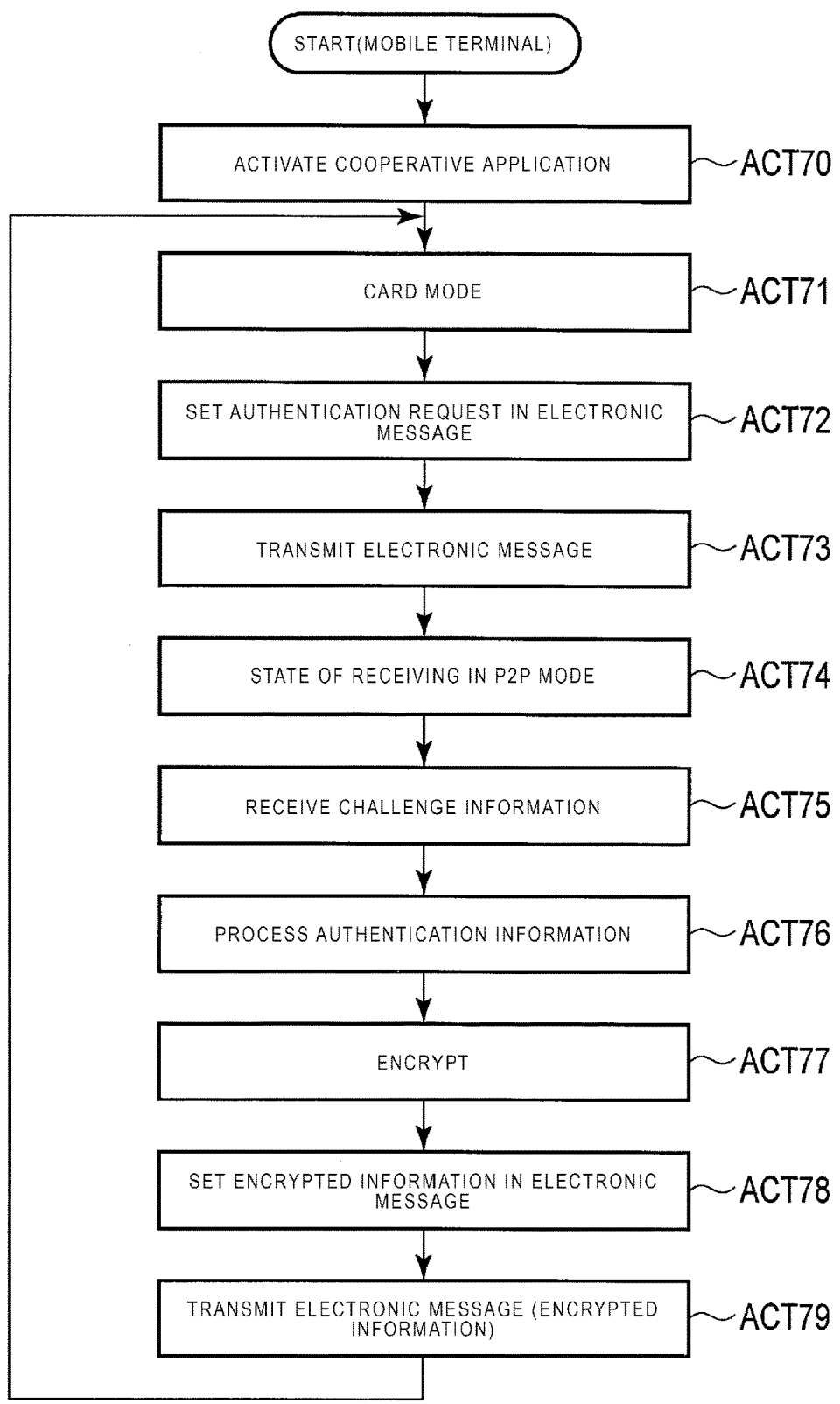
FIG. 7 is a flowchart for explaining an operation example of authentication processing in the mobile terminal.

FIG. 7 is a flowchart for explaining an operation example of the mobile terminal 2.

The control unit 21 of the mobile terminal 2 activates the cooperative application 22a according to the user's operation (ACT 70). For example, in the operation mode in which the MFP 1 may be available when the authentication using the mobile terminal 2 is successful, the user performs authentication processing using the mobile terminal 2 possessed by the user. When performing the authentication processing using the mobile terminal 2, the user operates the input device 24 to instruct activation of the cooperative application 22a. The control unit 21 activates the cooperative application 22a according to the user's operation.

When the cooperative application 22a is activated, the control unit 21 activates the non-contact communication device 27 as the card mode (ACT 71). When the non-contact communication device 27 is activated in the card mode, the control unit 21 starts authentication processing in cooperation with the MFP 1. When starting authentication processing, the control unit 21 may display a guidance or the like to start authentication by the MFP 1 on the display device 23.

In addition, when the authentication processing is started, the control unit 21 creates an electronic message in which the authentication request information is set (ACT 72). The authentication request information is information indicating a request for challenge information to be used for authentication processing. For example, the control unit 21 creates an electronic message of a predetermined format in which authentication request information is set in the tag information.

After setting the electronic message in which the authentication request information is set, the non-contact communication device 27 transmits the electronic message in which the authentication request information is set in the communication range E (ACT 73). For example, when the user holds the mobile terminal 2 over the communication range E, the non-contact communication device 27 receives radio waves from the non-contact communication device 17 of the MFP 1 in the reader mode and transmits the electronic message. In this case, the control unit 21 may display a guide on the display device 23 to hold the mobile terminal 2 in the communication range E.

After transmitting the electronic message in which the authentication request information is set by the non-contact communication device 27, the control unit 21 makes it possible to receive the electronic message transferred in the P2P mode (ACT 74). If the specification is such that the electronic message transferred in the P2P mode may be received in the card mode, the control unit 21 keeps the operation mode in the card mode. In addition, if the specification is such that the electronic message transferred in the P2P mode may not be received in the card mode, the control unit 21 switches the operation mode from the card mode to the P2P mode. In this case, the control unit 21 may switch the non-contact communication device 27 to the P2P mode after transmitting the electronic message in which the authentication request information is set.

In the state that the electronic message transferred in the P2P mode may be received, the non-contact communication device 27 receives the electronic message including the challenge information from the non-contact communication device 17 in the P2P mode (ACT 75). Upon receiving the electronic message including the challenge information, the control unit 21 extracts the challenge information from the received electronic message. Upon extracting the challenge information, the control unit 21 processes the authentication information using the extracted challenge information (ACT 76). For example, the control unit 21 processes the authentication information by combining the authentication information and the challenge information by the predetermined algorithm. For example, the authentication information is information such as a password. It is assumed that the authentication information is stored in a memory in the mobile terminal 2 such as the storage device 22 and is not changed unless there is a request from the user or the like.

When information obtained by processing the authentication information by using the challenge information (information obtained by combining the authentication information and the challenge information) is generated, the control unit 21 encrypts the generated information (ACT 77). For example, the control unit 21 specifies the encryption method specified in the electronic message including the received challenge information. In addition, as the encryption method, a preset method may be used. Upon specifying the encryption method, the control unit 21 generates encrypted information by encrypting the information processed by the authentication information using the challenge information according to the specified encryption method.

After generating encrypted information, the control unit 21 sets the electronic message in which the generated encrypted information is set in the tag information (ACT 78). Upon setting the electronic message in which the encrypted information is set, the control unit 21 transmits the electronic message including the encrypted information from the non-contact communication device 27 in the card mode (ACT 79). In this way, the non-contact communication device 17 of the MFP 1 that is switched to the reader mode receives the electronic message in which the encrypted information including the authentication information generated by the mobile terminal 2 is set.

As described above, according to the present embodiment, when the MFP in the reader mode receives the electronic message in which the authentication request information is set from the mobile terminal, the MFP switches the operation mode to the P2P mode. After switching the operation mode to the P2P mode, the MFP transmits the electronic message in which the challenge information is set to the mobile terminal in the P2P mode. After transmitting the challenge information in the P2P mode, the MFP extracts the authentication information from the information obtained by decrypting the encrypted information included in the electronic message received from the mobile terminal and performs authentication processing.

In addition, the mobile terminal that transmitted the electronic message in which the authentication request information is set to the MFP in the card mode receives the electronic message including the challenge information transferred in the P2P mode from the MFP. The mobile terminal encrypts the information obtained by combining the received challenge information and the authentication information and transmits the electronic message in which the encrypted information is set to the MFP.

According to the above MFP and the mobile terminal, the secure authentication processing may be realized using NFC without using another interface.

For example, in a form in which the mobile terminal transmits the authentication information to the device to be authenticated without change, if the authentication information does not change, the same information is always transmitted. This means that a device other than the device to be authenticated reads authentication information and may easily create a terminal having the same information. Generally, the mobile terminal may operate in the card mode even in a locked state. In such a case, it is possible to fraudulently obtain authentication information from the mobile terminal left in the locked state and to create a card or a mobile terminal that may be fraudulently authenticated.

On the other hand, in the present embodiment, the authentication information transmitted from the mobile terminal to the MFP is information included in the encrypted information obtained by further encrypting the information combined with the challenge information. Therefore, the information transmitted from the mobile terminal is information that changes every time authentication processing is performed, and since the information is encrypted, security is high. In addition, even if a third party eavesdrops on the information transmitted from the mobile terminal to the MFP, it is hard to obtain authentication information from the eavesdropped information. As a result, according to the present embodiment, it is possible to securely exchange information such as authentication information.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a non-contact communication device that performs non-contact communication in a reader mode or an inter-device communication mode; and
a processor that determines whether or not transmission request information for requesting transfer of specific information is set in a first electronic message received by the non-contact communication device in the reader mode from a second non-contact communication device that performs non-contact communication in a card mode, and switches the non-contact communication device to the inter-device communication mode when it is determined that the transmission request information is set in the first electronic message received by the non-contact communication device in the reader mode from a second non-contact communication device, and causes the non-contact communication device that is switched to the inter-device communication mode to transmit a second electronic message including information requested in the transmission request information to the second non-contact communication device.

2. The apparatus according to claim 1,
wherein the processor further switches the non-contact communication device to the reader mode after transmitting the second electronic message including the information requested in the transmission request information in the inter-device communication mode.

3. The apparatus according to claim 1, further comprising:
a communication device that performs data communication through a communication method different from the non-contact communication by the non-contact communication device,
wherein the transmission request information is information for requesting transfer of connection information for performing data communication by the communication device, and
the processor sets the connection information in the second electronic message to be transmitted by the non-contact communication device that is switched to the inter-device communication mode.

4. The apparatus according to claim 1,
wherein the transmission request information is information for requesting information to be used for authentication processing, and
the processor generates challenge information when receiving the first electronic message including the transmission request information and sets the challenge information in the second electronic message to be transmitted by the non-contact communication device that is switched to the inter-device communication mode.

5. The apparatus according to claim 4,
wherein the processor decrypts encrypted information to acquire authentication information when the non-contact communication device receives a third electronic message including the encrypted information after transmitting the second electronic message in which the challenge information is set.

6. The apparatus according to claim 1,
wherein the processor further switches the non-contact communication device to the reader mode, on condition that the second electronic message is transmitted to the second non-contact communication device by the non-contact communication device switched to the inter-device communication mode.

7. The apparatus according to claim 1,
wherein the processor further reactivates the non-contact communication device when it is determined that the transmission request information is set in the first electronic message.

8. The apparatus according to claim 6,
wherein the processor further reactivates the non-contact communication device when the second electronic message is transmitted to the second non-contact communication device.

9. A non-transitory recording medium storing a program that causes a processor to:
- operate a non-contact communication device mounted in a mobile terminal in a card mode;
- transmit a first electronic message in which transmission request information for requesting transfer of specific information by the non-contact communication device in the card mode is set to a second non-contact communication device in a reader mode;
- control the non-contact communication device to receive a second electronic message transmitted from the second non-contact communication device switched to an inter-device communication mode after transmitting the first electronic message by the non-contact communication device in the card mode; and
- receive the second electronic message including information requested in the transmission request information to be transmitted by the second non-contact communication device switched to the inter-device communication mode by receiving the first electronic message transmitted from the non-contact communication device.

10. The medium according to claim 9,
wherein the transmission request information is information for requesting connection information for data communication with an information processing apparatus through a communication method different from non-contact communication by the non-contact communication device, and
the program further causes the processor to extract the connection information from the second electronic message received by the non-contact communication device that is switched to the inter-device communication mode.

11. The medium according to claim 9,
wherein the transmission request information is information for requesting challenge information to be used for authentication processing, and
the program further causes the processor to transmit a third electronic message in which information obtained by processing authentication information using the challenge information is set to the second non-contact communication device when the second non-contact communication device receives the second electronic message including the challenge information to be transmitted in the inter-device communication mode.

12. The medium according to claim 11,
wherein the program further causes the processor to switch the non-contact communication device to the inter-device communication mode after transmitting the second electronic message in which the transmission request information is set.

13. An information exchange method between a first non-contact communication device and a second non-contact communication device, the method comprising:
- operating the first non-contact communication device in a reader mode;
- determining whether or not transmission request information for requesting transfer of specific information is set in a first electronic message received by the first non-contact communication device in the reader mode from the second non-contact communication device that performs non-contact communication in a card mode,
- switching the first non-contact communication device to an inter-device communication mode when it is determined that the transmission request information is set in the first electronic message received by the first non-contact communication device in the reader mode; and
- causing the first non-contact communication device that is switched to the inter-device communication mode to transmit a second electronic message including information requested in the transmission request information.

* * * * *